United States Patent Office 2,950,307
Patented Aug. 23, 1960

2,950,307
POLYISOCYANATE COMPOSITIONS

Harold France, Arthur Lambert, and Thomas James Meyrick, Manchester, England, assignors to Imperial Chemical Industries Limited, London, England, a corporation of Great Britain No Drawing. Filed Dec. 19, 1955, Ser. No. 553,742

Claims priority, application Great Britain Dec. 24, 1954

7 Claims. (Cl. 260—453)

This invention relates to polyisocyanate compositions of reduced tendency to discolour.

Polyisocyanates are of interest as cross-linking agents or curing agents in the manufacture of polymeric materials in the form of coatings, impregnations, solid synthetic rubbers, cellular rubbery materials and the like. For many of these purposes the tendency of polyisocyanates to discolour on storage is a serious disadvantage.

We have now found that this tendency to discolour can be reduced by adding to the polyisocyanate certain phenols.

Thus according to the present invention we provide polyisocyanate compositions of reduced tendency to discolour comprising at least one polyisocyanate and at least one phenol containing at least one tertiary alkyl or α-alkylcycloalkyl radical having from 4 to 8 carbon atoms.

Any polyisocyanate can be used in the compositions of this invention. Thus for example there may be used ethylene diisocyanate, butylene diisocyanate, hexamethylene diisocyanate, benzene di- and tri-isocyanates, toluene di- and tri-isocyanates, diphenylmethane p:p'-diisocyanates, dicyclohexylmethane diisocyanates, chlorobenzene di- and tri-isocyanates, naphthalene di- and tri-isocyanates, stilbene diisocyanate, ditolylmethane p:p'-diisocyanates, dixylylmethane diisocyanates, diphenylpropane p:p'-diisocyanates, diphenylmethane tetraisocyanate, trimethylbenzene triisocyanates, phenyltolylmethane triisocyanates, ditolylmethane triisocyanates, triphenylmethane triisocyanates, diphenylene-4:4'-diisocyanate, 3:3'-dimethyldiphenylene-4:4'-diisocyanate, 3:3'-dimethoxy-diphenylene-4:4'-diisocyanate, diphenyl triisocyanates and diphenylcyclohexane-p:p'-diisocyanate.

These isocyanates are aliphatic and cycloaliphatic diisocyanates as well as aromatic di- and tri-isocyanates.

Phenols that can be used in the compositions of this invention include those described in British Patent 677,584, U.S. Patent 2,748,096 and U.S. application Serial No. 384,335, now U.S. Patent 2,839,493, for example bis-(2-hydroxy-3-tert.-butyl-5-methylphenyl)methane, bis-(2-hydroxy-3-α-methylcyclohexyl-5-methylphenyl)methane, 2-α-methylcyclohexyl-4:6-dimethylphenol, 2-tert.-butyl-4:6-dimethylphenol, tert.-butyl-4-methoxyphenol. The phenols can also be used in the form of their normal or basic salts with aluminium, barium, calcium, magnesium, strontium or zinc.

The polyisocyanate compositions may be prepared by a simple mixing process, optionally in the presence of solvents. In order to secure satisfactory mixing of the ingredients it may be desirable to employ elevated temperatures.

Suitable proportions of the phenol in the compositions are from 0.1% to 5% by weight of the polyisocyanate. Within this range of proportions it is found that the tendency of the polyisocyanate to discolour is significantly diminished without any adverse effect.

The invention is illustrated but not limited by the following examples in which parts are by weight.

Example 1

Technical quality diisocyanatophenylmethane was distilled to yield pale straw-coloured material. 100 parts of the distilled quality diisocyanate were heated to 80° C. and 1 part of 2-α-methylcyclohexyl-4:6-dimethylphenol was added with stirring. Another 100 parts of the distilled material was heated to 80° C., but no addition to it was made. After cooling the two samples were split in two and packed in (a) Sealed glass bottles
(b) Hermetically sealed tins.

After storage for one week the distilled isocyanate in the bottle was green brown in colour. The tinned material was brown. The samples containing 2-α-methylcyclohexyl-4:6-dimethylphenol were unchanged from their original colour. After 6 months storage the samples with no additive were very dark brown in colour. Both samples with 2-α-methylcyclohexyl-4:6-dimethyl phenol had yellowed slightly.

Example 2

Compositions similar to those described in Example 1 were made replacing the 2-α-methylcyclohexyl-4:6-dimethylphenol by 0.5 part of bis-(2-hydroxy-3-α-methylcyclohexyl-5-methylphenyl)methane. Storage results obtained were virtually identical to those of Example 1.

Example 3

60 parts of the distilled diisocyanate of Example 1 were dissolved in 140 parts of dry toluene. To 100 parts of this solution 0.3 part of 2-α-methylcyclohexyl-4:6-dimethylphenol was added and completely dissolved. Portions of this composition were packed as described in Example 1. The remaining 100 parts of the solution of the distilled isocyanate were stored in identical containers. After two weeks the samples containing no 2-α-methylcyclohexyl-4:6-dimethylphenol were dark brown in colour. After 4 months, the samples containing the 2-α-methylcyclohexyl-4:6-dimethylphenol were unchanged from their original colour.

Example 4

Compositions as described in Example 3 were prepared replacing the 2-α-methylcyclohexyl-4:6-dimethylphenol by 1.2 parts of bis(2-hydroxy-3-α-methylcyclohexyl-5-methylphenyl)-methane. Storage results similar to those described in Example 3 were obtained.

What we claim is:

1. Polyisocyanate compositions of reduced tendency to discolour consisting essentially of at least one polyisocyanate selected from the group consisting of aliphatic, cycloaliphatic and aromatic di- and tri-isocyanates and at least one phenol containing at least one radical selected from the group consisting of tertiary alkyl and α-alkylcycloalkyl radicals having from 4 to 8 carbon atoms, the proportion of phenol in the composition being from 0.1% to 5% by weight of the polyisocyanate.

2. A polyisocyanate composition according to claim 1 wherein said polyisocyanate is diisocyanatophenylmethane.

3. A polyisocyanate composition according to claim 2 wherein said phenol is 2-α-methylcyclohexyl-4:6-dimethylphenol.

4. A polyisocyanate composition according to claim 2 wherein said phenol is bis-(2-hydroxy-3α-methylcyclohexyl-5-methylphenyl)methane.

5. A polyisocyanate composition according to claim 1 wherein said polyisocyanate is selected from the group consisting of ethylene diisocyanate, butylene diisocyanate, hexamethylene diisocyanate, benzene di- and tri-isocyanates, toluene di- and tri-isocyanates, diphenylmethane p:p'- diisocyanates, dicyclohexylmethane diisocyanates, chlorobenzene di- and tri-isocyanates, naphthalene di- and tri-isocyanates, stilbene diisocyanate, ditolylmethane p:p'-diisocyanates, dixylylmethane diisocyanates, diphenylpropane p:p'-diisocyanates, diphenylmethane tetraisocyanate, trimethylbenzene triisocyanates, phenyltolylmethane triisocyanates, ditolylmethane triisocyanates, triphenylmethane triisocyanates, diphenylene-4:4'-diisocyanate, 3:3'-dimethyldiphenylene-4:4'-diisocyanate, 3:3' - dimethoxydiphenylene-4:4'-diisocyanate, diphenyl triisocyanates and diphenylcyclohexane-p:p'-diisocyanate.

6. A polyisocyanate composition according to claim 1 wherein said phenol is selected from the group consisting of bis-(2-hydroxy-3-tert.-butyl-5-methylphenyl)methane, bis - (2 - hydroxy-3-α-methylcyclohexyl-5-methylphenyl)-methane, 2 - α - methylcyclohexyl-4:6-dimethylphenol, 2-tert.-butyl-4:6-dimethylphenol, tert.-butyl-4-methoxyphenol and the normal and basic salts thereof.

7. An organic isocyanate selected from the group consisting of aliphatic and cycloaliphatic diisocyanates and aromatic di- and tri-isocyanates stabilized against discoloration by having dissolved therein from 0.1% to 0.5% by weight, based on the isocyanate, of a tertiary butyl phenol.

References Cited in the file of this patent

UNITED STATES PATENTS

| | | |
|---|---|---|
| 2,086,418 | Hunt et al. | July 6, 1937 |
| 2,437,867 | Verbanc | Mar. 16, 1948 |
| 2,476,779 | Sturgis | July 19, 1949 |
| 2,573,779 | Walters | Nov. 6, 1951 |
| 2,589,979 | Stickland | Mar. 18, 1952 |
| 2,591,651 | Young | Apr. 1, 1952 |
| 2,729,666 | Stallman | Jan. 3, 1956 |